Jan. 7, 1930. G. DOSCHER Re. 17,554

PAPER CONTAINER

Original Filed Dec. 16, 1926

Inventor
George Doscher
By his Attorney
Frank E. L. Knigsberg

Reissued Jan. 7, 1930 Re. 17,554

UNITED STATES PATENT OFFICE

GEORGE DOSCHER, OF MOUNT VERNON, NEW YORK

PAPER CONTAINER

Original No. 1,634,096, dated June 28, 1927, Serial No. 155,126, filed December 16, 1926. Application for reissue filed June 14, 1929. Serial No. 370,969.

This invention relates to paper containers in the form of envelopes adapted to contain, hold and enclose small or large articles to be either given away for advertising purposes or sold. As an example of the use to which such an envelope container may be put, the invention herein is disclosed as being used for holding toothpicks, but obviously the invention is not limited to such use.

In the drawing accompanying this specification,

Figure 1:
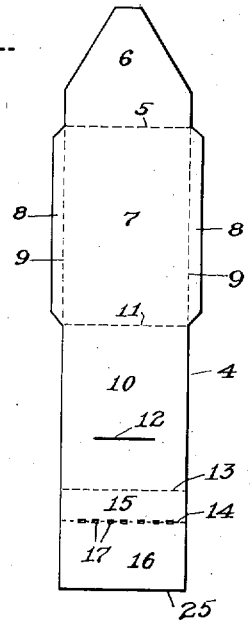
Fig. 1 is a view of a paper blank from which the envelope is made.

Referring to the drawing the envelope is made from a paper blank cut and scored as shown in Figure 1 and comprising a relatively narrow long rectangularly formed blank 4 scored as at 5 to provide a closing flap 6. Adjacent the flap 6 the blank forms a back portion 7 having a length equal to the full length of the completed envelope. To both sides of the back there are provided side closing wings, 8, 8 adapted to be folded along the scored lines 9, 9.

Continuing lengthwise of the blank there is formed a front portion 10 adjacent the back 7 and adapted to be folded parallel to the back along the scored line 11. The front 10 has a slit 12 for receiving the end of the closing flap 6.

The other end of the blank is scored as at 13 and 14 to form a front and a back pocket portion 15 and 16 respectively. Along the scored line 14 the blank is provided with perforations 17 serving as entrances for the articles 18 into the envelope itself.

Figure 2:
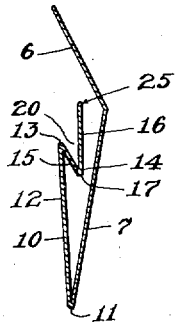
Fig. 2 is a sectional view showing the manner in which the blank is folded.

The envelope is folded as shown in Figure 2. The front 10 is bent, at 11 back upon the back 7. The front pocket portion 15 is bent at 13 downwardly and inwardly back upon the front 10 and the portion 16 is bent in the reverse direction at 14 to extend upwardly. The portions 15 and 16 therefore lie within the envelope and forms a pocket which is open at the top, while the perforations 17 are at the bottom of said pocket. The edge 25 of the pocket member 16 is pasted against the back 7 along the line 5.

Figure 3:
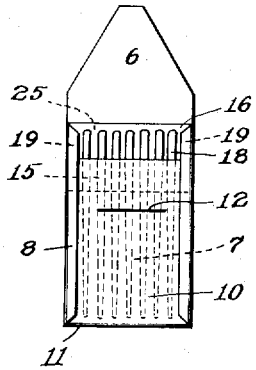
Fig. 3 is a face view of the completed envelope with articles therein.

The wings 8 are pasted and folded upon the front 10 and pasted down against said front and against those side portions 19 or edges of the rear pocket portions 16 which project above the line 13, all as clearly shown. The result is an envelope having a pocket 20, see Fig. 2, of less depth than the envelope and in which the articles may be conveniently inserted in a manner so that their one ends are exposed as seen in Figure 3. By reason of the fact that the wings 8 are pasted to the edges 19 of the part 16 and the latter pasted to the back 7 at 25 the only opening to appear is that leading to the pocket 20.

In the event that bulky articles are to be contained within the envelope, the perforations 17 may be less in number and the wings 8 may be wider, or they may be omitted.

The invention provides a handy, convenient and sanitary container or package for large or small articles of different kinds. It is readily manufactured at a low cost.

I claim:

As a new article of manufacture, an envelope of the character described comprising an envelope body having a front, a back and a closing flap adapted to detachably engage in a slit in the said front to close the envelope, the upper portion of said envelope front terminating in pocket members bent to form a pocket for receiving the upper parts of the articles to be contained in the envelope, which latter are inserted in perforations provided in the bottom of said pocket and the larger portions of said articles being contained within said envelope below the said pocket, and side-wings on said envelope for closing the sides thereof.

GEORGE DOSCHER.